(No Model.)

J. W. THRUSH.
REVERSIBLE DOUBLE SHOVEL PLOW.

No. 476,578. Patented June 7, 1892.

Witnesses:
J. P. McGirr.
F. M. Heaton.

John W. Thrush,
Inventor.
Wm. Moore,
Attorney.

UNITED STATES PATENT OFFICE.

JOHN W. THRUSH, OF KEYSER, WEST VIRGINIA, ASSIGNOR OF TWO-THIRDS TO A. P. RITZELL AND P. H. NEFFLEN, OF SAME PLACE.

REVERSIBLE DOUBLE-SHOVEL PLOW.

SPECIFICATION forming part of Letters Patent No. 476,578, dated June 7, 1892.

Application filed September 16, 1891. Serial No. 405,850. (No model.)

*To all whom it may concern:*

Be it known that I, JOHN W. THRUSH, a citizen of the United States of America, residing at Keyser, (Ridgeville P. O.,) in the county of Mineral and State of West Virginia, have invented certain new and useful Improvements in Reversible Double-Shovel Plows, of which the following is a specification, reference being had therein to the accompanying drawings.

My invention is an improvement in cultivator-plows, and has for its object to provide a double reversible-shovel plow which will permit of the shovel upon either side being held in advance of the other while cultivating close to the row upon that side.

The invention consists in the construction of plow hereinafter described and claimed, and illustrated in the accompanying drawings, in which—

Figure 1:
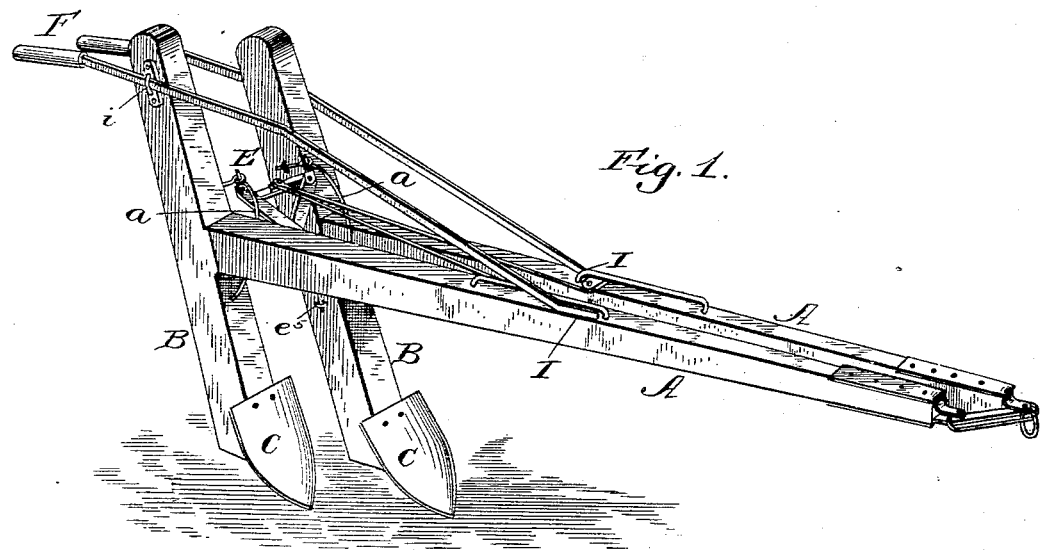
Figure 2:
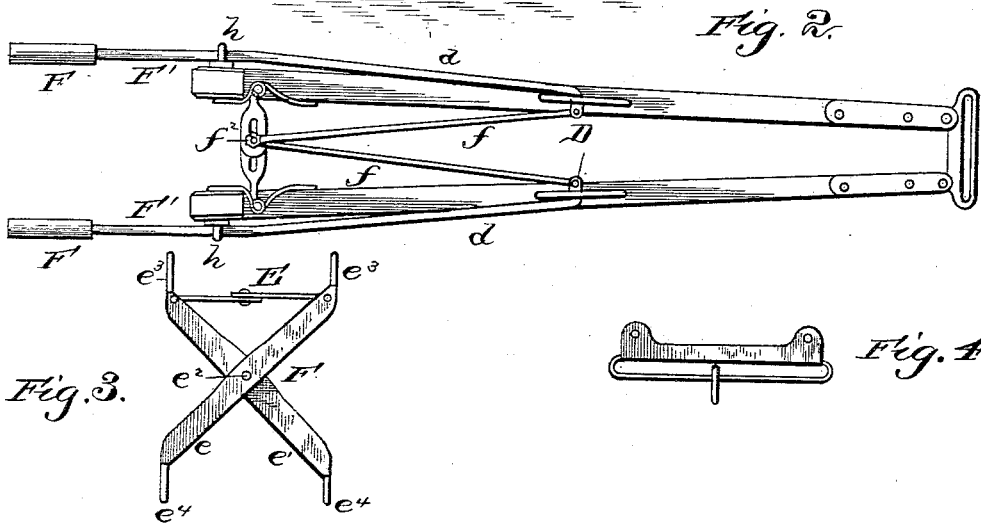
Figure 3:
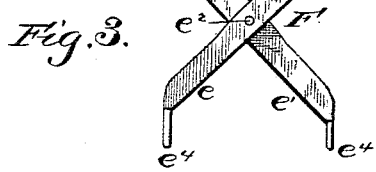
Figure 4:
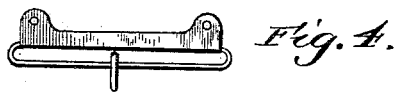

Figure 1 is a perspective view of my improved plow, showing one of the shovels held in advance of the other. Fig. 2 is a plan view. Fig. 3 is a view of the hinge connecting the plow-standards. Fig. 4 is a view of the link connecting the plow-beams.

In the drawings, A A represent the two beams of my double plow, and B B the standards, to which the beams are secured. Secured to the lower ends of the standards B B are the shovels C C, of any suitable or desired form. These parts form the two sections of my double plow, and are pivotally connected to each other by the hinge E and link D, hereinafter more fully described.

The hinge E (shown more clearly in Fig. 3) consists of the two bars of metal $e$ $e'$, pivotally connected to each other at their centers by a bolt or rivet $e^2$. Extensions or ears $e^3$ $e^3$ and $e^4$ $e^4$ are provided on the upper and lower ends of the bars $e$ $e'$. The ears $e^4$ are held in suitable eyes $e^5$, secured to the standard. Braces $a$ $a$ serve to strengthen the connection of the beams and standards, and these braces have eyes formed thereon, said eyes being adapted to receive the upper ears $e^3$ of the hinge. If desired, however, instead of forming the eyes upon the braces, the upper ears may be held in eyes secured directly to the standards in the same manner as the lower ears.

For varying the amount of space between the shovels and holding them firmly the desired distance apart I have provided the brace rods or bars $f$ $f'$, which have their outer ends pivotally attached to the upper ends of the bars $e$ $e'$, their inner ends overlapping and being provided with longitudinal slots, through which passes a bolt $f^2$, provided with a thumb-nut, thus allowing the brace to be extended or contracted and the distance between the standards increased or diminished at will.

The plow-beams are connected at their forward ends by the link D, before referred to, this link being provided with the extensions $d$, by means of which it is pivotally connected with the plow-beams, as shown.

For guiding the plow I have provided the handles F F in rear of the standards, formed upon the ends of the rods F' F'. These rods F' F' pass through staples $h$ in the standard, and their front ends are bent inwardly at right angles, as at $i$. These ends $i$ are adapted to slide in the ways I, formed upon or secured to the upper surface of the plow-beams. Other rods H are secured to the bent ends $i$ inside the ways, and the other and rear ends of these rods are pivotally attached to the braces $f$ $f'$ in any suitable manner.

The clevis which connects the doubletree to the plow will rest, when the horses are drawing the plow forward, in one end of the link D and the ends of the link extend out beyond the pivotal point of attachment of each beam, and thus one of the shovels will be held in advance of the other. When it is desired to change the relative positions of the shovels and place the other in advance and next to the row, the plow being out of the ground, the standard formerly in advance is drawn to the rear and the other advanced, the clevis slips to the other end of the link, and as the draft is primarily upon the beam in advance the other is automatically held in rear thereof as long as the horses are drawing the plow forward.

I claim as my invention—

1. In combination, the beams and standards, shovels carried by the standards, a pivoted frame connecting the standards, handles guided on the beams, and standards and rods connecting the handles with the pivoted frame or bracket, for the purpose described.

2. In combination, the standards carrying shovels, beams having their forward ends pivotally connected, guides carried by the beams, handles guided by said guides, a frame or bracket connecting the beams, and rods connecting the handles with the frame or bracket for moving the standards, for the purpose described.

3. In combination, the beams and standards, shovels carried by the standards, a link connecting the forward ends of the beams, a bracket pivotally connecting the standards, and suitable handles for guiding the plow, said handles consisting of rods passing through staples in the standards and having their forward ends sliding in ways formed on the beams, and rods connecting the bent ends with the bracket between the standards.

In testimony whereof I affix my signature in presence of two witnesses.

JOHN W. THRUSH.

Witnesses:
ORLANDO THAY,
J. W. KEYS.